(12) United States Patent
Britton

(10) Patent No.: US 6,778,887 B2
(45) Date of Patent: Aug. 17, 2004

(54) AQUATIC PESTICIDE APPLICATION SYSTEM

(76) Inventor: Joshua E. Britton, 314 Ryan St., Holmen, WI (US) 54636

( * ) Notice: Subject to any disclaimer, the term of this patent is extended or adjusted under 35 U.S.C. 154(b) by 0 days.

(21) Appl. No.: 10/461,943

(22) Filed: Jun. 13, 2003

(65) Prior Publication Data

US 2004/0030468 A1 Feb. 12, 2004

Related U.S. Application Data

(60) Provisional application No. 60/389,025, filed on Jun. 14, 2002.

(51) Int. Cl.[7] ................................. G06F 7/00
(52) U.S. Cl. ................. 701/21; 701/36; 701/213; 210/198.1; 210/749
(58) Field of Search .................. 701/21, 35–36, 701/205, 212, 213, 116, 224; 210/198.1, 242.1, 749

(56) References Cited

U.S. PATENT DOCUMENTS

| | | |
|---|---|---|
| 4,747,958 A | 5/1988 | Eberhardt |
| 4,818,416 A | 4/1989 | Eberhardt |
| 4,877,524 A | 10/1989 | Eberhardt |
| 4,882,072 A | 11/1989 | Eberhardt |
| 5,089,120 A | 2/1992 | Eberhardt |
| 5,386,368 A | 1/1995 | Knight |
| 5,424,957 A | 6/1995 | Kerkhoff et al. |
| 5,481,815 A | 1/1996 | Murphy et al. |
| 5,546,092 A | 8/1996 | Kurokawa et al. |
| 5,585,626 A | 12/1996 | Beck et al. |
| 5,717,593 A | 2/1998 | Gvili |
| 5,862,501 A | 1/1999 | Talbot et al. |
| 5,919,242 A | 7/1999 | Greatline et al. |
| 6,122,581 A | 9/2000 | McQuinn |
| 6,199,000 B1 | 3/2001 | Keller et al. |
| 6,266,595 B1 | 7/2001 | Greatline et al. |
| 6,432,304 B1 | 8/2002 | Nguyen |
| 2002/0119891 A1 | 8/2002 | Netherland |

Primary Examiner—Gertrude A. Jeanglaude

(57) ABSTRACT

An aquatic pesticide application system for applying at least one pesticide to a body of water from a floating vessel is disclosed. The system comprises a dispensing system for the pesticide(s), a receiver on the vessel for receiving position data from a global positioning system satellite, a storage device for storing digital map data representing a predetermined pesticide treatment plan for the body of water, and a processor for receiving position data and digital map data wherein the processor continuously outputs pesticide delivery signals derived from comparing position data and digital map data to the dispensing system to dispense pesticide(s) to the body of water when the vessel is directed over the body of water.

25 Claims, 4 Drawing Sheets

AQUATIC PESTICIDE APPLICATION SYSTEM

CROSS-REFERENCES TO RELATED APPLICATIONS

The application claims benefit from U.S. Provisional Patent Application No. 60/389,025 filed Jun. 14, 2002.

STATEMENT REGARDING FEDERALLY SPONSORED RESEARCH

Not Applicable.

BACKGROUND OF THE INVENTION

1. Field of the Invention

This invention relates to an aquatic pesticide application system for applying at least one pesticide to a body of water from a floating vessel.

2. Description of the Related Art

Various methods and equipment for treating bodies of water with treatment agents are described in U.S. Pat. Nos. 5,481,815, 5,089,120, 4,882,072, 4,877,524, 4,818,416 and 4,747,958, and U.S. Patent Publication No. US 2002/0119891 A1. For example, U.S. Pat. No. 4,818,416 describes a method and a vessel for treating bodies of water with treatment agents. The vessel includes an onboard microcomputer that receives signals from a water depth sensor, a water pH sensor, and a speed sensor. The vessel includes a tank hull including a supply of a treatment agent. A pump and pump engine are in fluid communication with the tank hull. The pump pumps treatment agent to spray arms. The microcomputer is also connected to a flow meter which detects flow through the pump outlet, and is also connected to the pump engine to control output from the pump. The vessel of U.S. Pat. No. 4,818,416 may include dual pumping systems which are both operated by computer signals to dispense treatment agents at a rate determined by the measured speed of the vessel, the measured water depth and pH, and a predetermined application rate for the treatment agent. The dual pumping systems can dispense different treatment agents in various ratios and at various rates. Product delivery assemblies on the vessel may deliver treatment agents such as herbicides to the water surface or under the surface.

Various methods and equipment for farmland treatment activities, such as the application of pesticides, are described in U.S. Pat. Nos. 6,199,000, 6,122,581, 5,919,242, 5,862,501, 5,585,626 and 5,424,957. For example, U.S. Pat. No. 5,919,242 describes prescription farming methods in which herbicide is applied to sections of land based on GPS data. First, herbicide application rates are determined for land zones within various longitudinal and latitudinal coordinates on a plot of land. The application rate data is fed to a controller aboard a vehicle and as the vehicle traverses the plot of land, the controller receives GPS data and controls the herbicide application rate from dispensers attached to the vehicle.

However, there is still a need for an improved system for applying pesticides to a body of water from a floating vessel.

SUMMARY OF THE INVENTION

The foregoing needs are met by an aquatic pesticide application system according to the invention for applying at least one pesticide to a body of water from a floating vessel. The system comprises a dispensing system for the pesticide (s), a receiver on the vessel for receiving position data from a global positioning system satellite, a storage device for storing digital map data representing a predetermined pesticide treatment plan for the body of water, and a processor for receiving position data and digital map data wherein the processor continuously outputs pesticide delivery signals derived from comparing position data and digital map data to the dispensing system to dispense pesticide(s) to the body of water when the vessel is directed over the body of water.

The dispensing system is associated with the vessel for delivering at least one pesticide to the body of water. Each pesticide is suitable for destroying or inhibiting the action of at least one aquatic pest in or on the body of water. The dispensing system includes a reservoir for each pesticide and a controllable flow device associated with each reservoir for regulating the application rate of each pesticide to the body of water.

The receiver on the vessel receives position data from a global positioning system satellite when the vessel is directed over the body of water. The storage device stores digital map data representing a predetermined pesticide treatment plan for the body of water.

The processor is in communication with the receiver and the storage device for receiving position data and digital map data. The processor continuously outputs pesticide delivery signals derived from comparing position data and digital map data when the vessel is directed over the body of water. The pesticide delivery signals correspond to an application amount for each pesticide at a position on the body of water. The processor is in communication with each controllable flow device for providing pesticide delivery signals to each controllable flow device such that each pesticide is applied to the body of water in accordance with the predetermined pesticide treatment plan for the body of water.

In another aspect, the invention provides a method for applying at least one pesticide to a body of water from a floating vessel. The method comprises providing a dispensing system associated with the floating vessel for delivering at least one pesticide to the body of water, each pesticide being suitable for destroying or inhibiting the action of at least one aquatic pest in or on the body of water, the dispensing system including a reservoir for each pesticide and a controllable flow device associated with each reservoir for regulating the application rate of each pesticide to the body of water; storing digital map data representing a predetermined pesticide treatment plan for the body of water in a digital storage device; directing the floating vessel over the body of water; receiving position data in a receiver from a global positioning system satellite when the vessel is directed over the body of water; continuously outputting, from a processor in communication with the receiver and the storage device, pesticide delivery signals derived from comparing position data and digital map data when the vessel is directed over the body of water, the pesticide delivery signals being indicative of an application amount for each pesticide at a position on the body of water; and providing from the processor pesticide delivery signals to each controllable flow device such that each pesticide is applied to the body of water in accordance with the predetermined pesticide treatment plan for the body of water.

These and other features, aspects, and advantages of the present invention will become better understood upon consideration of the following detailed description, drawings, and appended claims.

BRIEF DESCRIPTION OF THE DRAWINGS

Like reference numerals will be used to refer to like or similar parts from Figure to Figure in the following description of the invention.

DETAILED DESCRIPTION OF THE INVENTION

Figure 1:
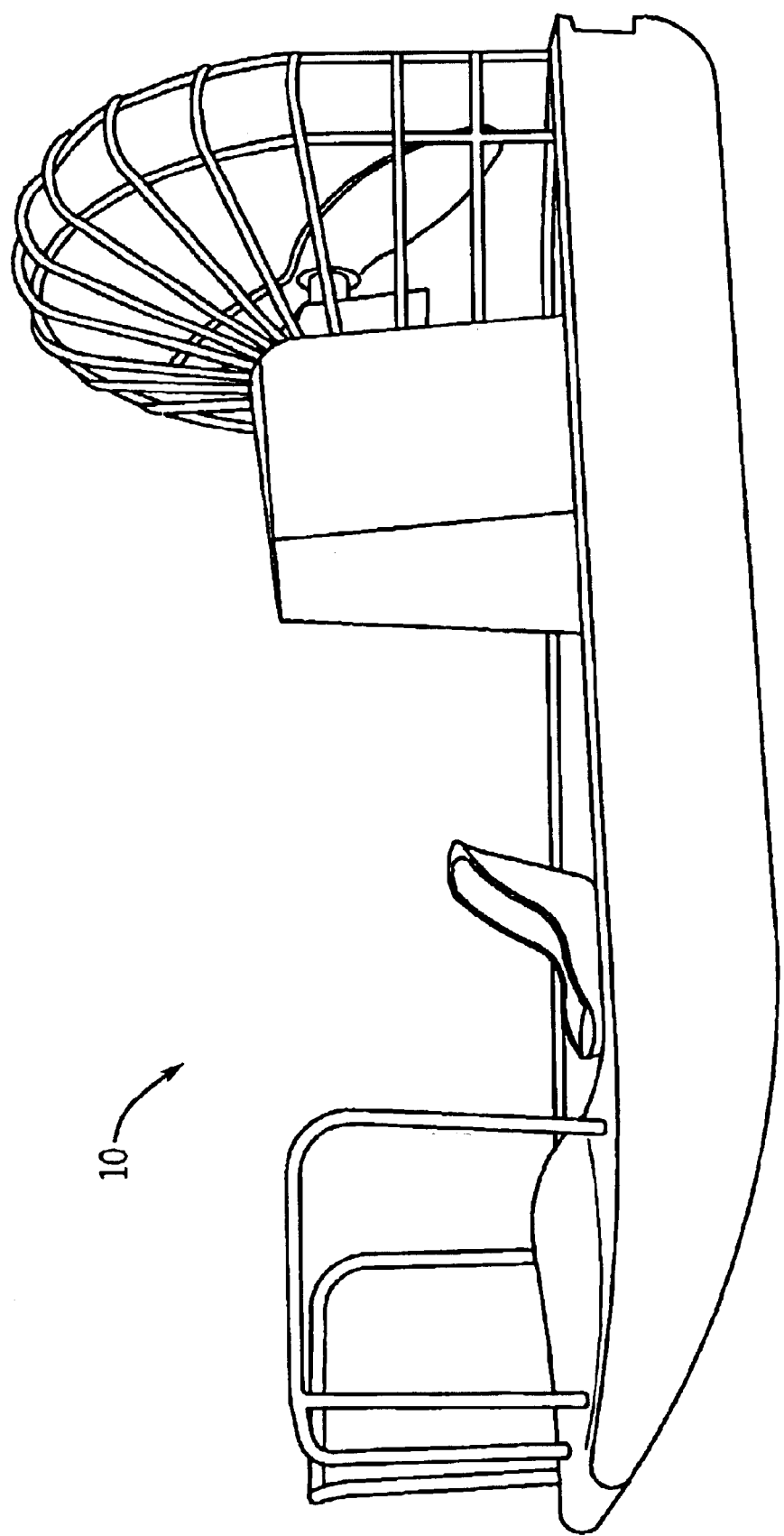
FIG. 1 shows an air boat suitable for use with an aquatic pesticide application system according to the invention.
Figure 2:
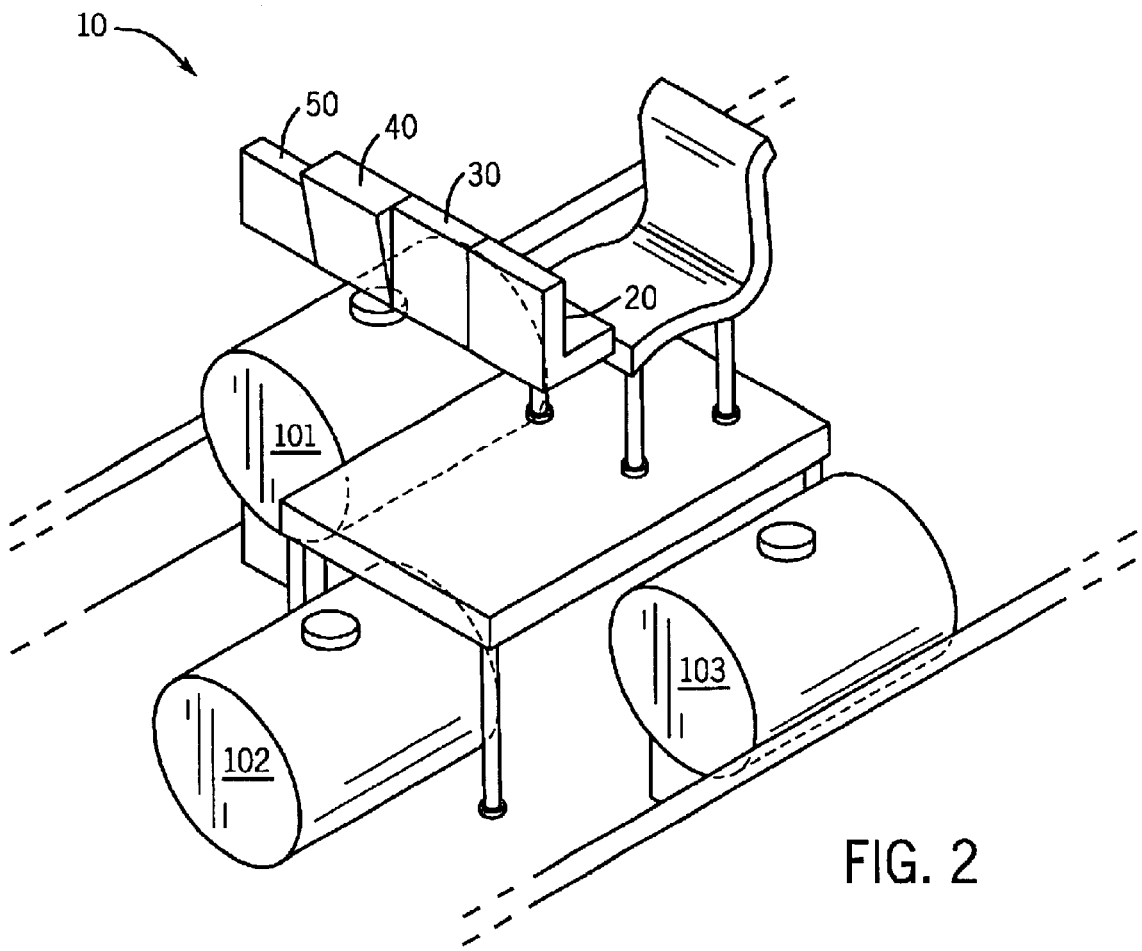
FIG. 2 shows the onboard controllers and three pesticide tanks according to one version of the aquatic pesticide application system.
Figure 4:
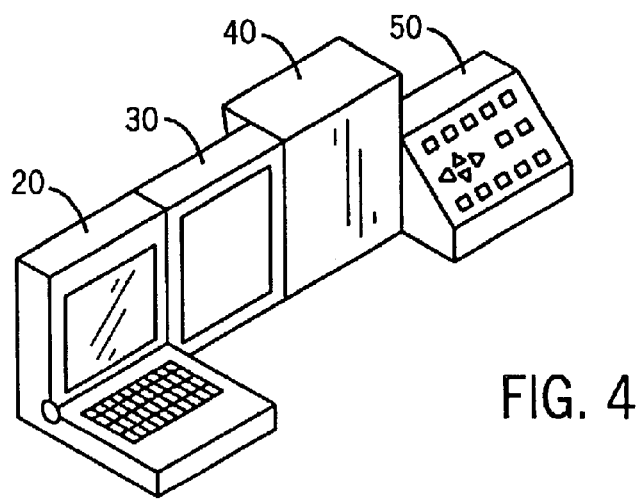
FIG. 4 shows the onboard controllers according to the version of the aquatic pesticide application system shown in FIG. 2.

The present invention is directed to an aquatic pesticide application system for applying at least one pesticide to a body of water from a floating vessel. The system (as depicted in FIGS. 1–5) comprises a dispensing system 100 for the pesticide(s), a receiver 30 on the vessel 10 for receiving position data from a global positioning system satellite, a storage device 40 for storing digital map data, and a processor 20 for receiving position data and digital map data wherein the processor continuously outputs pesticide delivery signals derived from comparing position data and digital map data to the dispensing system 100 to dispense pesticide(s) to the body of water when the vessel 10 is directed over the body of water. By "pesticide", it is meant any substance, organic or inorganic, used to destroy or inhibit the action of microorganism, plant or animal pests. The term includes, without limitation, herbicides, insecticides, algaecides, larvicides, bactericides and fungicides.

The aquatic pesticide application system includes a dispensing system 100 for applying at least one pesticide to a body of water from a floating vessel 10. Looking at FIG. 5, there is shown a schematic of the flow paths in one example embodiment of the dispensing system 100 used in the aquatic pesticide application system. The dispensing system 100 includes: three pesticide reservoirs 101, 102, 103; five controllable pumps 111, 112, 113, 152, 155 (such as those manufactured by Raven Industries and available from Ag-Chem Sales Co., Inc., Jackson, Minn., USA); five flow meters 121, 122, 123, 153, 156 (such as those manufactured by Teejet and available from Ag-Chem Sales Co., Inc., Jackson, Minn., USA); seven shut off valves 131, 132, 133, 150, 250, 350, 450 (such as those manufactured by Raven Industries and available from Ag-Chem Sales Co., Inc., Jackson, Minn., USA); a mixing chamber 140; a water tank 151; a movable manual wand 161; an adjustable surface boom 162; and an adjustable below surface boom 163.

The three pesticide reservoirs 101, 102, 103 may be conventional chemical reservoirs such as 50 gallon chemical reservoirs. The three pesticide reservoirs 101, 102, 103 are in fluid communication with the controllable pumps 111, 112, 113 respectively by way of individual fluid flow conduits such as conventional flexible tubing. The controllable pumps 111, 112, 113 are in fluid communication with the flow meters 121, 122, 123 respectively by way of individual fluid flow conduits such as conventional flexible tubing. The flow meters 121, 122, 123 are in fluid communication with the shut off valves 131, 132, 133 respectively by way of individual fluid flow conduits such as conventional flexible tubing. The shut off valves 131, 132, 133 are in fluid communication with the mixing chamber 140 respectively by way of individual fluid flow conduits such as conventional flexible tubing.

The water tank 151, the controllable pump 152, and the flow meter 153 are optional features of the dispensing system 100. The water tank 151 may be a conventional tank including 100 gallons of tap water. The water tank 151 is in fluid communication with the controllable pump 152 which is in turn in fluid communication with the flow meter 153 by way of individual fluid flow conduits such as conventional flexible tubing. The flow meter 153 is in fluid communication with the mixing chamber 140 by way of a fluid flow conduit such as conventional flexible tubing.

The controllable pump 155 and the flow meter 156 are optional features of the dispensing system 100. The body of water 154 under the vessel 10 is in fluid communication with the controllable pump 155 which is in turn in fluid communication with the flow meter 156 by way of individual fluid flow conduits such as conventional flexible tubing. The flow meter 156 is in fluid communication with the mixing chamber 140 by way of a fluid flow conduit such as conventional flexible tubing.

The mixing chamber 140 is in fluid communication with the shut off valve 150 by way of a fluid flow conduit such as conventional flexible tubing. The shut off valve 150 is in fluid communication with at least one of the movable manual wand 161, the adjustable surface boom 162, and the adjustable below surface boom 163. In other words, the dispensing system may include: one of the movable manual wand 161, the adjustable surface boom 162, and the adjustable below surface boom 163; two of the movable manual wand 161, the adjustable surface boom 162, and the adjustable below surface boom 163; or three of the movable manual wand 161, the adjustable surface boom 162; and the adjustable below surface boom 163. Secondary shut off valves 250, 350, 450 may be placed in fluid lines between the shut off valve 150 and the movable manual wand 161, the adjustable surface boom 162, and the adjustable below surface boom 163 respectively.

The five controllable pumps 111, 112, 113, 152, 155, the five flow meters 121, 122, 123, 153, 156, and the seven shut off valves 131, 132, 133, 150, 250, 350, 450 are all in electrical communication with the processor 20 to receive control signals. The dispensing system 100 then operates as follows. Based on data derived from comparing position data and digital map data when the vessel is directed over the body of water as will be explained below, the processor 20 provides individual pump control signals to each of the five controllable pumps 111, 112, 113, 152, 155. The individual pump control signals indicate to the five controllable pumps 111, 112, 113, 152, 155 a mode of operation. For example, a pump control signal may instruct a pump to remain off, to increase pumping speed, to decrease pump speed or to maintain pumping speed. Thus, each of the five controllable pumps 111, 112, 113, 152, 155 may be in a separate mode of operation at any time.

The controllable pumps 111, 112, 113 draw pesticide from the three pesticide reservoirs 101, 102, 103 respectively. The flow meters 121, 122, 123 provide flow rate signals back to the processor 20 such that the processor can adjust the pump control signals to the controllable pumps 111, 112, 113. In other words, the pump control signals provided by the processor 20 to the controllable pumps 111, 112, 113 are derived in part from actual flow readings from the flow meters 121, 122, 123. The shut off valves 131, 132, 133 are an optional feature of the invention. The processor 20 provides individual shut off signals to each of the shut off valves 131, 132, 133 to close the fluid path to the mixing chamber 140. These shut off valves 131, 132, 133 provide an extra stop gate on pesticide delivery should the user not wish to rely on pump off signals alone provided by the processor 20 to the controllable pumps 111, 112, 113.

The pesticides drawn from the three pesticide reservoirs 101, 102, 103 by the controllable pumps 111, 112, 113 are mixed together in the mixing chamber 140. Optionally, controllable pump 152 draws water from the water tank 151. The flow meter 152 provides flow rate signals back to the processor 20 such that the processor can adjust the pump control signals to the controllable pump 152. The water drawn from the water tank 151 by the controllable pump 152 is mixed together in the mixing chamber 140 with the pesticides. Optionally, controllable pump 155 draws water from the body of water 154. The flow meter 156 provides flow rate signals back to the processor 20 such that the processor can adjust the pump control signals to the controllable pump 156. The water drawn from the body of water 154 by the controllable pump 155 is mixed together in the mixing chamber 140 with the pesticides. It should also be understood that the dispensing system 100 may not provide for the mixing of water with the pesticides in the mixing chamber 140.

Fluid pressure provided by the five controllable pumps 111, 112, 113, 152, 155 moves the pesticide mixture or pesticide and water mixture from the mixing chamber 140 to any of the movable manual wand 161; the adjustable surface boom 162; and the adjustable below surface boom 163 that are included in the dispensing system 100. The shut off valve 150 is an optional feature of the invention. The processor 20 provides a shut off signal to the shut off valve 150 to close the fluid path from the mixing chamber 140 to any of the movable manual wand 161; the adjustable surface boom 162; and the adjustable below surface boom 163 that are included in the dispensing system 100. The shut off valves 250, 350, 450 are also optional feature of the invention. The processor 20 provides a shut off signal to the shut off valves 250, 350, 450 to close the fluid path from the mixing chamber 140 to any of the movable manual wand 161; the adjustable surface boom 162; and the adjustable below surface boom 163. Pesticide delivery from any of the movable manual wand 161, the adjustable surface boom 162, and the adjustable below surface boom 163 is as described above.

Figure 3:
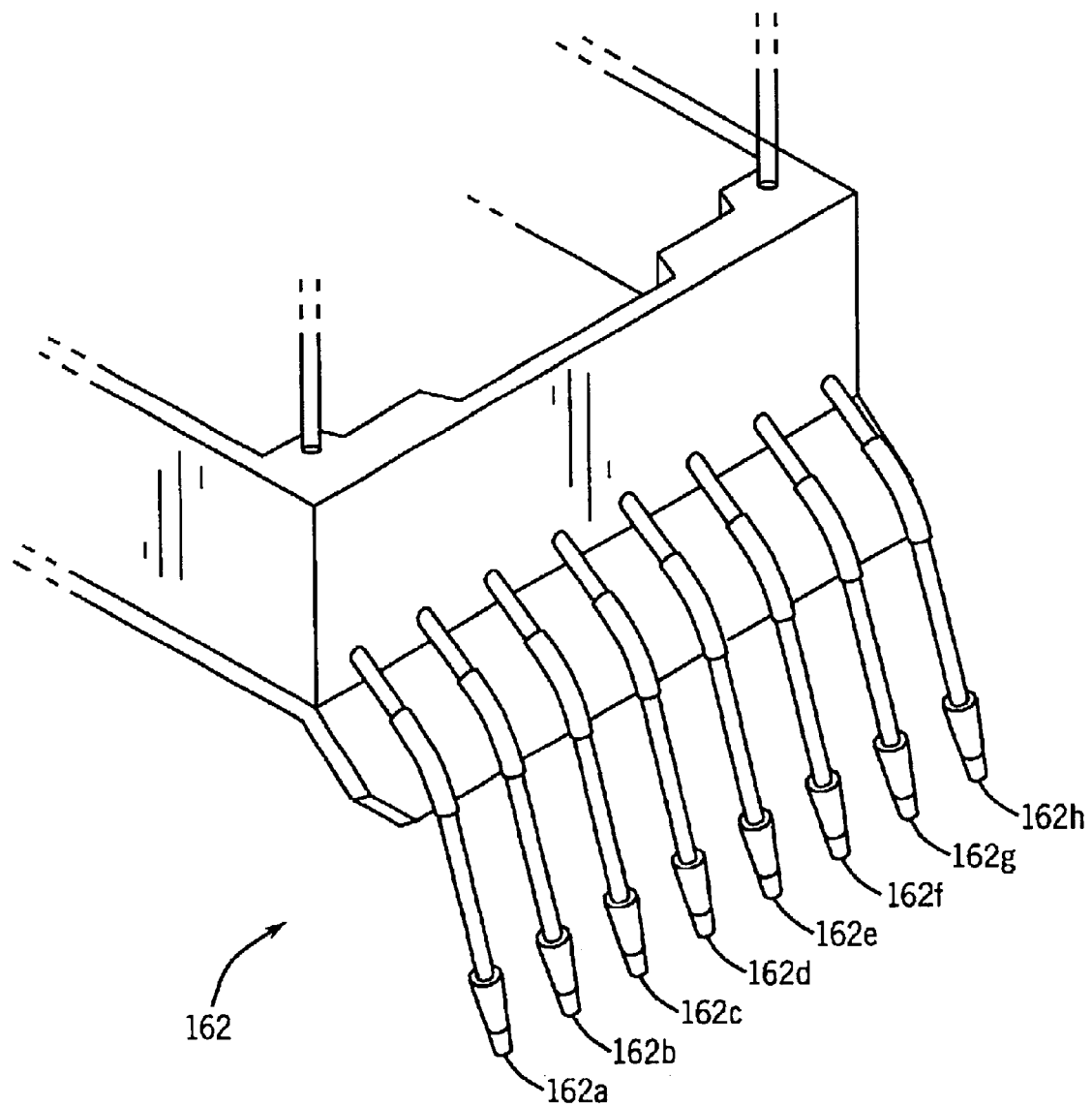
FIG. 3 shows a spray injection system according to one version of the aquatic pesticide application system.
Figure 5:
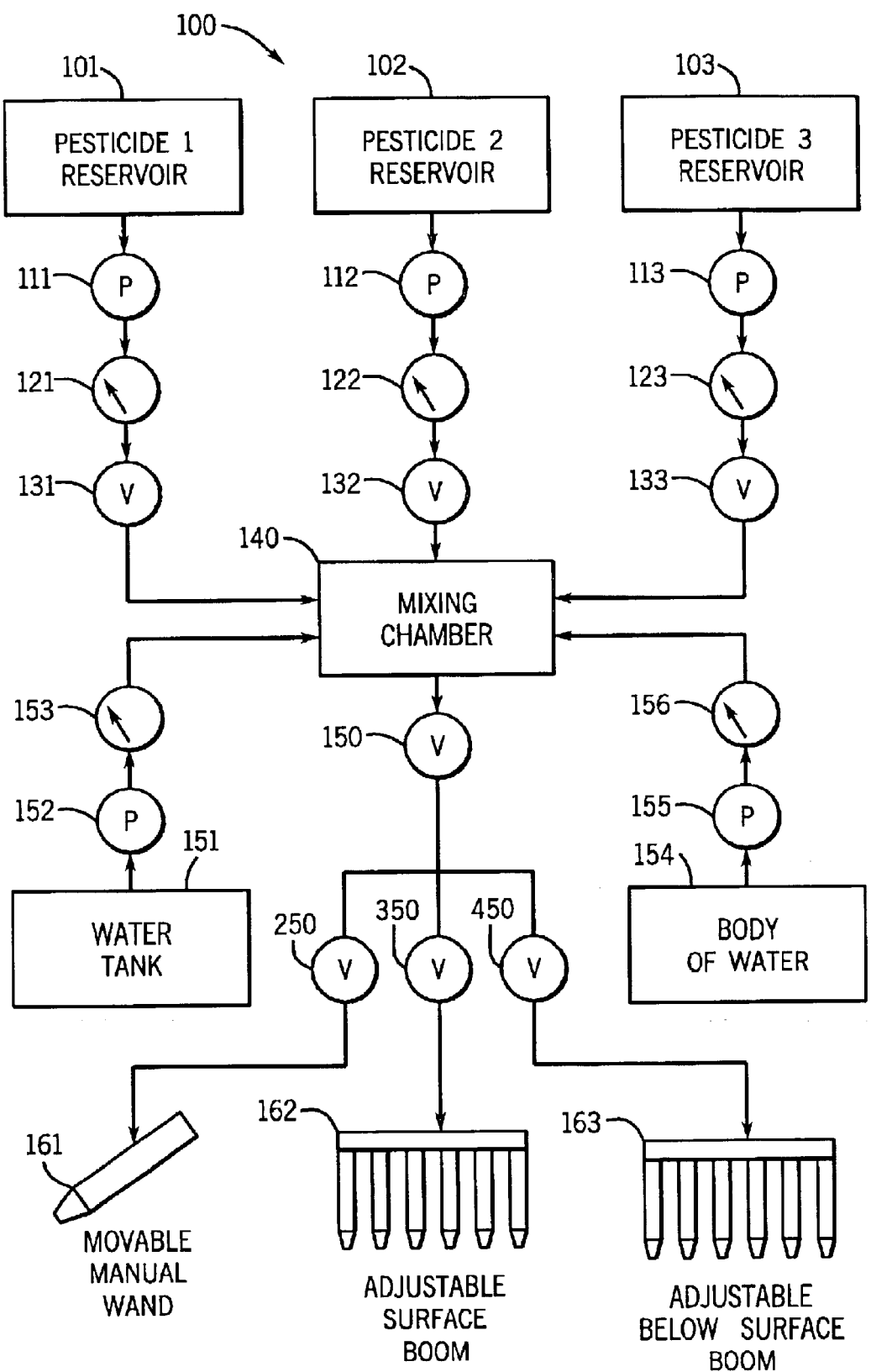
FIG. 5 is a schematic of a dispensing system according to one version of the aquatic pesticide application system.

Looking at FIG. 3, the adjustable surface boom 162 is mounted at the rear of the vessel 10. The adjustable surface boom 162 includes spray arms 162a–162h that serve to direct the pesticide mixture or pesticide and water mixture received from the mixing chamber 140 to the surface of the body of water as the vessel 10 is directed over the body of water. The adjustable surface boom 162 may be movable with respect to the vessel 10 or may be fixed with respect to the vessel. When the adjustable surface boom 162 is provided in a movable form, the angle of delivery and the delivery distance from the surface of the body of water may be varied. Such adjustability can be provided by use of suitable adjustment means such as a pivoting boom mount.

Still referring to FIG. 3, it can be appreciated that the adjustable surface boom 162 can be reconfigured to comprise the adjustable below surface boom 163. Specifically, by providing spray arms 162a–162h with an elongated structure, the spray arms 162a–162h will be immersed below the surface of the body of water when the vessel 10 directed over the body of water. By use of suitable adjustment means such as a pivoting boom mount, the depth of immersion of the spray arms 162a–162h below the surface of the body of water can be adjusted.

A movable manual wand 161 may also be provided at the rear of vessel. Essentially, the movable manual wand 161 is configured much like any of the spray arms 162a–162h. However, the wand 161 is not mounted to the vessel 10, and therefore, may be moved freely by a user to spray anywhere above or below the surface of the body of water.

Optionally, a second dispensing system including at least one tank for a supplemental pesticide and a spray device associated with each tank for applying each supplemental pesticide to the body of water may also be provided on the vessel 10. The second dispensing system allows for application of a pesticide anywhere above or below the surface of the body of water completely independent of the dispensing system 100. In other words, pesticide application from the second dispensing system is user controlled and not under control of the processor 20. Preferably, the storage device or another storage device store position data and pesticide delivery signals received from the second dispensing system when the vessel is directed over the body of water such that the application rate of each supplemental pesticide at each position can be reviewed after the vessel is directed over the body of water.

The receiver 30 on the vessel operates as follows. The receiver uses the global positioning system (GPS) to provide exact and continually updated information concerning the position of the vessel 10 in global coordinates. Such receivers are commercially available Ag-Chem Sales Co., Inc., Jackson, Minn., USA under the brand name Starlink®, and may include differential correction methods to integrate data from a number of satellites and reference stations. The receiver can receive from GPS satellites and provide the correct latitude, longitude and altitude of the vessel 10, along with the precise time and date, and the speed and track over the body of water of the vessel. Such data can then be transmitted to the processor 20 to be used as hereinafter described.

The aquatic pesticide application system includes a storage device 40 for storing digital map data representing a predetermined pesticide treatment plan for the body of water. A predetermined digitized map including a pesticide treatment plan for the body of water to be treated is entered into a data base which is stored in the storage device. Such a predetermined digitized map including a pesticide treatment plan can be created using SGIS 3® or HGIS® software and equipment sold by Soilteq, Minnetonka, Minn., USA. Such software and equipment provides for, among other things, the mapping of a body of water and aquatic pests within the body of water using global coordinates.

A review of the location of aquatic pests within the body of water provides the global coordinates where a specific pesticide must be applied to the body of water. For example, if a first plant species should be treated with a first level of a first pesticide and a second plant species should be treated with a second level of a second pesticide, the predetermined digitized map including a pesticide treatment plan for the body of water would include data signaling the use of the first pesticide at the first level within the global coordinates where the first plant species is located and the use of the second pesticide at the second level within the global coordinates where the second plant species is located. In order to precisely control the delivery of pesticides, the predetermined digitized map including a pesticide treatment plan for the body of water may include data on water depth at global coordinates on the body of water, or data on water quality parameters (such as pH or dissolved oxygen) at global coordinates on the body of water.

Under certain circumstances, it may also be desirable for the vessel to follow a predetermined path on the body of water. In these situations, a predetermined digitized map including a path on the body of water can be created using the SGIS 3® or HGIS® software and equipment sold by Soilteq, Minnetonka, Minn., USA. Such software and equipment provides for a mapping of a body of water that allows for the creation of a path across the body of water.

The storage device 40 may be part of the processor 20 or a separate interfaced device. The pesticide treatment plan can be extracted by the processor to control the dispensing system such that each body of water reference point is accurately and precisely treated with the desired mixture and quantity of pesticides.

The processor 20 uses the predetermined digitized map including a pesticide treatment plan and the aforesaid latitude, longitude, speed and track data from the receiver for determining dispensing points and rates for each pesticide on or under the surface of the body of water. The processor may also use the predetermined digitized map including a path across the body of water and the aforesaid latitude, longitude, speed and track data from the receiver for assisting in the navigation of the vessel 10 over the body of water. In situations where such navigation capabilities are desired, a navigation device 50 (such as a light bar commercially available from Ag-Chem Sales Co., Inc., Jackson, Minn., USA) in communication with the processor for receiving the navigation signals from the processor is provided on the vessel. The navigation device indicates deviation from the predetermined path for the vessel on the body of water based on the navigation signals received from the processor. For example, a deviation to the left off of the predetermined path may light a rightward facing arrow on the light bar.

The processor 20 may be a microcomputer but may also be any other type of digital or analog computer or controller which can receive the required data and process it, such as a laptop computer or a PDA. One commercially available processor suitable for use with the invention is sold under the trademark Falcon® by Ag-Chem Sales Co., Inc., Jackson, Minn., USA.

The processor 20 may also use data from various sensors for determining dispensing points and rates for each pesticide on or under the surface of the body of water. For example, the aquatic pesticide application system may include a commercially available water depth sensor in communication with the processor for providing water depth signals to the processor, and/or a commercially available speed sensor in communication with the processor for providing speed signals to the processor. The aquatic pesticide application system may also include a pH sensor in communication with the processor for providing pH signals to the processor. The aquatic pesticide application system may also include a dissolved oxygen sensor in communication with the processor for providing dissolved oxygen signals to the processor.

An example operating sequence for the invention is as follows. Using the SGIS 3® or HGIS® software and equipment, a coordinate map is created for a body of water along with the location of three plant species in the body of water. A predetermined digitized map including a pesticide treatment plan is then created. In a first area of coordinates, a first pesticide must be applied to a first plant species at a first rate; in a second area of coordinates, a second pesticide must be applied to a second plant species at a second rate; and in a third area of coordinates, a third pesticide must be applied to a third plant species at a third rate. The first, second and third areas overlap in a fourth area.

The predetermined digitized map including a pesticide treatment plan is entered into a storage device on the vessel. The storage device communicates the predetermined digitized map with a processor on the vessel. The vessel is then directed over a body of water. A receiver continuously provides the correct latitude, longitude, time, date, speed and track of the vessel over the body of water to the processor. The processor continuously compares latitude, longitude, time, date, speed and track data from the receiver and digital map data when the vessel is directed over the body of water. Based on this data, the processor transmits pesticide delivery signals, which are indicative of an application amount for each pesticide at a position on the body of water, to the dispensing system 100.

For instance, when the vessel is in the first area, the processor provides signals to the controllable pump 111 (see FIG. 5) to deliver the first pesticide at a certain rate to the water through at least one of the movable manual wand 161, the adjustable surface boom 162, and the adjustable below surface boom 163. The application rate can vary depending on the speed of the vessel and the depth of the water. For example, faster speeds and deeper water require a faster delivery rate. Changes in speed and water depth are continuously fed to the processor (by way of GPS or sensors) and the processor continuously sends appropriate adjusted signals to the controllable pump 111. Appropriate pump speeds are maintained by computer signal adjustment derived from flow data from flow meter 121 (see FIG. 5).

When the vessel is in the second area, the processor provides signals to the controllable pump 112 (see FIG. 5) to deliver the second pesticide. Changes in speed and water depth are continuously fed to the processor (by way of GPS or sensors) and the processor continuously sends appropriate adjusted signals to the controllable pump 112. Appropriate pump speeds are maintained by computer signal adjustment derived from flow data from flow meter 122 (see FIG. 5).

When the vessel is in the third area, the processor provides signals to the controllable pump 113 (see FIG. 5) to deliver the third pesticide. Changes in speed and water depth are continuously fed to the processor (by way of GPS or sensors) and the processor continuously sends appropriate adjusted signals to the controllable pump 113. Appropriate pump speeds are maintained by computer signal adjustment derived from flow data from flow meter 123 (see FIG. 5).

When the vessel is in the fourth area, the processor provides signals to the controllable pump 111 (see FIG. 5) to deliver the first pesticide, the processor provides signals to the controllable pump 112 (see FIG. 5) to deliver the second pesticide, and the processor provides signals to the controllable pump 113 (see FIG. 5) to deliver the third pesticide. Changes in speed and water depth are continuously fed to the processor (by way of GPS or sensors) and the processor continuously sends appropriate adjusted signals to the controllable pumps 111, 112, 113. Appropriate pump speeds are maintained by computer signal adjustment derived from flow data from flow meters 121, 122, 123.

The storage device or another storage device can store position data and pesticide delivery signals received from the processor when the vessel is directed over the body of water such that the application rate of each pesticide at each position can be reviewed after the vessel is directed over the body of water.

An aquatic pesticide application system for applying at least one pesticide to a body of water from a floating vessel was constructed as shown in FIGS. 1–4. A sixteen-foot aluminum airboat with a "bulletproof" Lexan™ hull was used as the vessel. This vessel is capable of various tasks from marshland analysis to land deployment and retrieval. It was powered by a 375 HP high performance marine motor with a top cruising speed of 50 knots. It was outfitted with a cellular phone, marine radio, Lowrance sonar, pilot to co-pilot communication, Satellite Differential GPS and a state-of-the-art computer system operating on a Windows® 2000 Professional Platform. This vessel had an empty draft of 4 inches and is useful in aquatic environments where conventional outboard motors are deemed ineffective.

The vessel included a three pesticide dispensing system with a boom injection system. Pesticides can be applied with an accuracy at a rate of 1 oz./per acre to 12 gal./per acre, at a speed of 5 mph to 30 mph, and with a 10' to 20' boom injection system. The vessel can carry as much as 160 gallons of product at one time made up of one, two or three different pesticides. Based on the application rates chosen for the specific pesticide and plant species, 3 separate pesticides can all be applied simultaneously, as a pair, or individually either subsurface or topical.

Specific project parameters such as water volume or area, plant species, water quality parameters, coordinate points, and various different project specific requirements are set prior to application in a digital map and the system is then calibrated to perform the application. During application, a map based application controller continually monitors the aqueous environment, boat speed, and GPS position while automatically adjusting the product flow through valves and flow meters to deliver a precise concentration of pesticide to the water's surface or through a boom jet injection system to the hypolimnion.

The map based application controller is connected to a Starlink® satellite navigational system and integrated into a light bar for accurate and reliable guidance into and throughout the treatment area in most any weather conditions. This certifies accurate non-skip, non-overlap coverage of the treatment area and eliminates the need to drop and retrieve path markers. As the products are applied, the map based application controller automatically records "as applied" data showing exactly what, where, when and how much product was applied for the entire project. This data can then be printed on site or back at another site.

The aquatic pesticide application system may apply any number of pesticides to a body of water to destroy or inhibit the action of at least one aquatic pest. The specific example above described three pesticides for the purposes of illustration. Non-limiting examples of aquatic pests include plant species, algae, zebra mussels, and larvae that produce a condition called swimmer's itch.

Although the present invention has been described in considerable detail with reference to certain embodiments, one skilled in the art will appreciate that the present invention can be practiced by other than the described embodiments, which have been presented for purposes of illustration and not of limitation. For example, while liquid pesticides have been described, it is possible to apply granular pesticides or pesticide slurries using the present invention with suitable dispensing equipment. Therefore, the scope of the appended claims should not be limited to the description of the embodiments contained herein.

What is claimed is:

1. An aquatic pesticide application system for applying at least one pesticide to a body of water from a floating vessel, the system comprising:

a dispensing system associated with the floating vessel for delivering at least one pesticide to the body of water, each pesticide being suitable for destroying or inhibiting the action of at least one aquatic pest in or on the body of water, the dispensing system including a reservoir for each pesticide and a controllable flow device associated with each reservoir for regulating the application rate of each pesticide to the body of water;

a receiver on the vessel for receiving position data from a global positioning system satellite when the vessel is directed over the body of water;

a storage device for storing digital map data representing a predetermined pesticide treatment plan for the body of water; and a processor in communication with the receiver and the storage device for receiving position data and digital map data, the processor continuously outputting pesticide delivery signals derived from comparing position data and digital map data when the vessel is directed over the body of water, the pesticide delivery signals being indicative of an application amount for each pesticide at a position on the body of water, the processor being in communication with each controllable flow device for providing pesticide delivery signals to each controllable flow device such that each pesticide is applied to the body of water in accordance with the predetermined pesticide treatment plan for the body of water.

2. The aquatic pesticide application system of claim 1 wherein:

the digital map data representing a predetermined pesticide treatment plan for the body of water includes data on water depth at positions on the body of water.

3. The aquatic pesticide application system of claim 1 wherein:

the digital map data representing a predetermined pesticide treatment plan for the body of water includes data on at least one aquatic pest selected from plant species, algae, zebra mussels, and larvae at positions on the body of water.

4. The aquatic pesticide application system of claim 1 wherein:

the digital map data representing a predetermined pesticide treatment plan for the body of water includes data on water quality parameters at positions on the body of water.

5. The aquatic pesticide application system of claim 1 wherein:

the digital map data further represents a predetermined path for the vessel on the body of water, the processor continuously outputs navigation signals derived from comparing position data and digital map data when the vessel is directed over the body of water, and the aquatic pesticide application system further comprises a navigation device in communication with the processor for receiving the navigation signals from the processor, the navigation device indicating deviation from the predetermined path for the vessel on the body of water based on the navigation signals received from the processor.

6. The aquatic pesticide application system of claim 1 wherein:

the aquatic pesticide application system further comprises a speed sensor in communication with the processor for providing speed signals to the processor, and the processor derives the pesticide delivery signals from comparing position data and digital map data and the speed signals.

7. The aquatic pesticide application system of claim 1 wherein:
the aquatic pesticide application system further comprises a water depth sensor in communication with the processor for providing water depth signals to the processor, and
the processor derives the pesticide delivery signals from comparing position data and digital map data and the water depth signals.

8. The aquatic pesticide application system of claim 1 wherein:
the aquatic pesticide application system further comprises a speed sensor in communication with the processor for providing speed signals to the processor,
the aquatic pesticide application system further comprises a water depth sensor in communication with the processor for providing water depth signals to the processor, and
the processor derives the pesticide delivery signals from comparing position data and digital map data, the speed signals, and the water depth signals.

9. The aquatic pesticide application system of claim 1 wherein:
the aquatic pesticide application system further comprises a water quality sensor in communication with the processor for providing water quality signals to the processor, and
the processor derives the pesticide delivery signals from comparing position data and digital map data and the water quality signals.

10. The aquatic pesticide application system of claim 1 wherein:
the dispensing system is fixed to the vessel and delivers at least one pesticide to the surface of the body of water.

11. The aquatic pesticide application system of claim 1 wherein:
the dispensing system is fixed to the vessel and delivers at least one pesticide under the surface of the body of water.

12. The aquatic pesticide application system of claim 1 wherein:
the dispensing system is movable with respect to the vessel and delivers at least one pesticide to the surface of body of water.

13. The aquatic pesticide application system of claim 1 wherein:
the storage device or another storage device stores position data and pesticide delivery signals received from the processor when the vessel is directed over the body of water such that the application rate of each pesticide at each position can be reviewed after the vessel is directed over the body of water.

14. The aquatic pesticide application system of claim 1 wherein:
the vessel is an airboat.

15. The aquatic pesticide application system of claim 1 wherein:
at least two different pesticides are applied to the body of water.

16. The aquatic pesticide application system of claim 1 wherein:
at least three pesticides are applied to the body of water.

17. The aquatic pesticide application system of claim 1 wherein:
each pesticide can be applied at a different rate to the body of water.

18. The aquatic pesticide application system of claim 1 wherein:
the dispensing system delivers at least one pesticide to a depth under the surface of body of water, and
the dispensing system includes means for varying the depth under the surface of body of water.

19. The aquatic pesticide application system of claim 1 further comprising:
a second dispensing system including at least one tank for a supplemental pesticide and a spray device associated with each tank for applying each supplemental pesticide to the body of water.

20. The aquatic pesticide application system of claim 19 wherein:
the storage device or another storage device stores position data and pesticide delivery signals received from the second dispensing system when the vessel is directed over the body of water such that the application rate of each supplemental pesticide at each position can be reviewed after the vessel is directed over the body of water.

21. A method for applying at least one pesticide to a body of water from a floating vessel, the method comprising:
providing a dispensing system associated with the floating vessel for delivering at least one pesticide to the body of water, each pesticide being suitable for destroying or inhibiting the action of at least one aquatic pest in or on the body of water, the dispensing system including a reservoir for each pesticide and a controllable flow device associated with each reservoir for regulating the application rate of each pesticide to the body of water;
storing digital map data representing a predetermined pesticide treatment plan for the body of water in a digital storage device;
directing the floating vessel over the body of water;
receiving position data in a receiver from a global positioning system satellite when the vessel is directed over the body of water;
continuously outputting, from a processor in communication with the receiver and the storage device, pesticide delivery signals derived from comparing position data and digital map data when the vessel is directed over the body of water, the pesticide delivery signals being indicative of an application amount for each pesticide at a position on the body of water; and
providing from the processor pesticide delivery signals to each controllable flow device such that each pesticide is applied to the body of water in accordance with the predetermined pesticide treatment plan for the body of water.

22. The method of claim 21 wherein:
the digital map data further represents a predetermined path for the vessel on the body of water,
the processor continuously outputs navigation signals derived from comparing position data and digital map data when the vessel is directed over the body of water, and
the method further comprises receiving in a navigation device the navigation signals from the processor, the navigation device indicating deviation from the predetermined path for the vessel on the body of water based on the navigation signals received from the processor.

23. The method of claim 21 wherein:
the vessel includes a speed sensor in communication with the processor for providing speed signals to the processor, and the processor derives the pesticide delivery signals from comparing position data and digital map data and the speed signals.

24. The method of claim 21 wherein:

the vessel includes a water depth sensor in communication with the processor for providing water depth signals to the processor, and the processor derives the pesticide delivery signals from comparing position data and digital map data and the water depth signals.

25. The method of claim 21 further comprising:

storing in the storage device or another storage device, position data and pesticide delivery signals received from the processor when the vessel is directed over the body of water such that the application rate of each pesticide at each position can be reviewed after the vessel is directed over the body of water.

* * * * *